Figure 1:
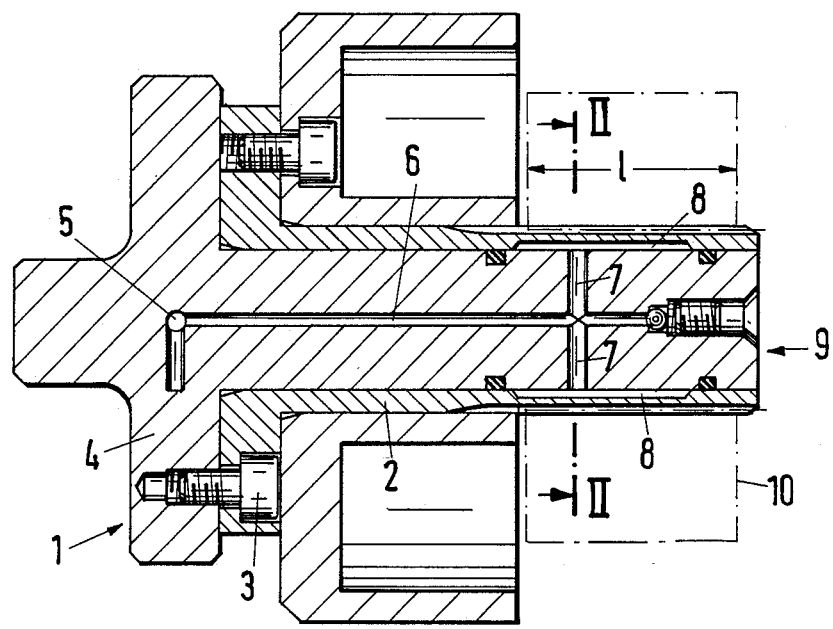

United States Patent [19]

Och

[11] Patent Number: 4,958,969
[45] Date of Patent: Sep. 25, 1990

[54] ADAPTER SLEEVE

[75] Inventor: Rudolf Och, Nuremberg, Fed. Rep. of Germany

[73] Assignee: Firma Frenco Verzahnungslehren GmbH, Altdorf, Fed. Rep. of Germany

[21] Appl. No.: 414,758

[22] Filed: Sep. 29, 1989

[30] Foreign Application Priority Data

Oct. 7, 1988 [DE] Fed. Rep. of Germany ... 8812608[U]

[51] Int. Cl.$^5$ .............................. B23C 5/26; B23B 31/40
[52] U.S. Cl. .................................... 409/234; 279/2 A; 279/4
[58] Field of Search ............... 409/234, 232; 279/2 R, 279/2 A, 4, 1 E, 1 Z, 1 R; 242/68.5; 82/40 R; 29/113.1; 75/242, 236, 246; 264/272.15, 272.19; 249/155, 144; 427/215

[56] References Cited

U.S. PATENT DOCUMENTS

| | | | |
|---|---|---|---|
| 4,131,242 | 12/1978 | Flores | 242/60.5 |
| 4,135,677 | 1/1979 | Warczak | 29/113.1 |
| 4,541,315 | 9/1985 | Kanamaru et al. | 82/40 R |
| 4,706,972 | 11/1987 | Kormos | 409/234 X |

FOREIGN PATENT DOCUMENTS

| | | | |
|---|---|---|---|
| 3046094 | 6/1982 | Fed. Rep. of Germany | 279/2 A |
| 19282 | 2/1979 | Japan | 279/2 R |

*Primary Examiner*—William Briggs
*Attorney, Agent, or Firm*—Toren, McGeady & Associates

[57] ABSTRACT

An adapter sleeve, the diameter of which is altered by means of the pressure of a fluid, whereby, as a result of this change in diameter, an object is held by means of the clamping force of the adapter sleeve, characterized in that the adapter sleeve is made of titanium or a titanium alloy and comprises a hard layer on the side which is adapted to clamp the object.

12 Claims, 4 Drawing Sheets

ADAPTER SLEEVE

The invention relates in principle to an adapter sleeve the diameter of which is altered by means of the pressure of a fluid, whereby, as a result of this change in diameter, an object is held by means of the clamping force of the adapter sleeve (preamble of claim 1). In this connection adapter sleeves are known for use with or on an expandable adapter mandrel which is operated by fluid pressure, which sleeves comprise spaces to conduct the fluid which is or will be under pressure situated on the inner side of the adapter sleeve, and the outer side of the adapter sleeve is designed and constructed to push against the object to be clamped (preamble of claim 2). Such sleeves are also termed expansion sleeves. These sleeves must fulfill two requirements, namely, on the one hand, they must be able to expand as much as possible, before the elastic limit of the material is reached, and, on the other hand, they must be very hard on the outside to make this as resistant as possible to wear during the mounting and removal of the object to be clamped. The previously conventional adapter sleeves made of steel or carbon fibre reinforced plastic did not meet both of these two requirements. Admittedly steel has a relatively high surface hardness but it has only a very small expansion coefficient. The same applies to adapter sleeves in accordance with DE-GM 88 06 700.9 which are made of steel with a coating of cubic, crystalline boron nitride (CBN-Korn). It is also true that carbon fibre reinforced plastic is relatively expandable, but it does not possess a sufficiently high surface hardness, i.e. the outer side of an adapter sleeve produced from such a plastic would very rapidly wear away.

The first object of the invention is to develop an adapter sleeve in accordance with the preamble of claim 1 already mentioned in the introduction in such a way that both the contradictory requirements, namely a relatively large change in diameter of the adapter sleeve, on the one hand, and a high surface hardness of the adapter sleeve, on the other hand, are met.

This objective was achieved, starting from the preamble of claim 1 mentioned in the introduction, by arranging that the adapter sleeve is made of titanium or a titanium alloy and comprises a hard layer on the side which is to clamp the object. It has surprisingly been found that, despite the difficulties of processing titanium, it is possible, whilst observing the need for very exact measurements, to produce the adapter sleeve according to the invention from titanium with a hard layer which is the correct size. Hereby the preconception that it is possible to have either a very high surface hardness, or a relatively large expansion coefficient of such an adapter sleeve, but that both requirements can not be fulfilled simultaneously, has been shown to be false. Instead, the expansion coefficient of such an adapter sleeve is about twice as large as that of a corresponding adapter sleeve made of steel. The hardness and wear resistance of the surface of an adapter sleeve which is manufactured according to the invention is at least equal to, if not greater than, that of a corresponding surface of an adapter sleeve made of steel.

In a first embodiment of the invention the hard layer consists of the hardened outer layer of an adapter sleeve which is made of titanium. This is possible despite the known difficulties which occur during the hardening and hot processing of titanium, and the advantages described above can be obtained thereby.

In another embodiment of the invention the outer layer consists of a coating of cubic, crystalline boron nitride (CBN-Korn). Such a coating can be applied to an unhardened titanium adapter sleeve. It is sufficiently hard, as is required for the reasons mentioned above. On the other hand, the previously described great elasticity of the titanium adapter sleeve which has not been hardened is still obtained.

The invention is particularly valuable, and this applies in the case of the two previously described variants mentioned in claims 3 and 4, when the outer side of the adapter sleeve is formed as a toothing and the outer side of this toothing comprises the hard layer. When the adapter sleeve is formed with an external toothing, the distances over which the sleeve must expand in order to obtain the necessary clamping are greater than when the surfaces which are to be clamped against each other of the adapter sleeve and of the object to be held are cylindrical. Therefore it is particularly important when producing an adapter sleeve with a toothing that the expansion coefficient of the adapter sleeve or of the toothing is as large as possible.

The invention also relates to an adapter sleeve for or on a hydraulic lathe chuck which is operated by fluid pressure, which comprises spaces to conduct the fluid which is or will be under pressure situated on the outer side of the adapter sleeve, wherein the inner side of the adapter sleeve is designed and constructed to push inwards against the object to be held. In this case too, the problems outlined in the introduction and the objective mentioned in the introduction apply, with the single exception that compression of the adapter sleeve is involved, instead of its expansion, since in this case the object to be held is inside the adapter sleeve. In this case, according to the invention, the adapter sleeve is made of titanium or a titanium alloy and its inner side comprises a hard layer (claim 6). The more detailed structures of this adapter sleeve and its hardened inner side are dealt with in claims 7 to 10. The explanations relating to claims 3-5 concerning the outer layer apply in a similar way to explain claims 7 to 9.

Details of further advantages and characteristics of the invention can be obtained from the other dependent claims and from the following description and the accompanying drawings of possible embodiments of the invention.

Figure 2:
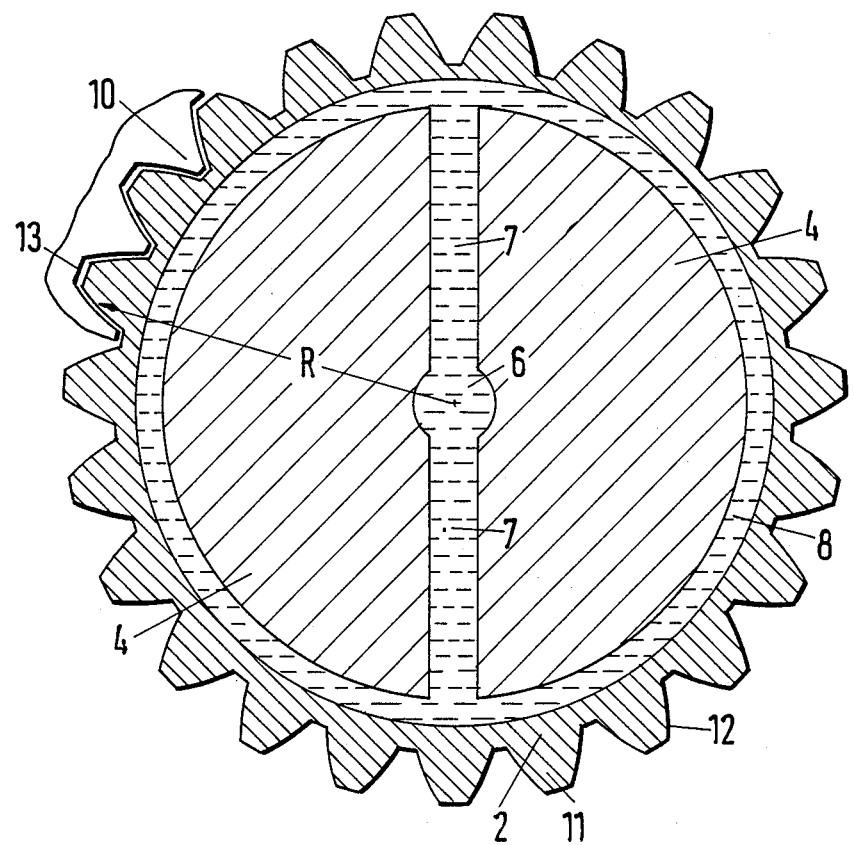
Figure 3:
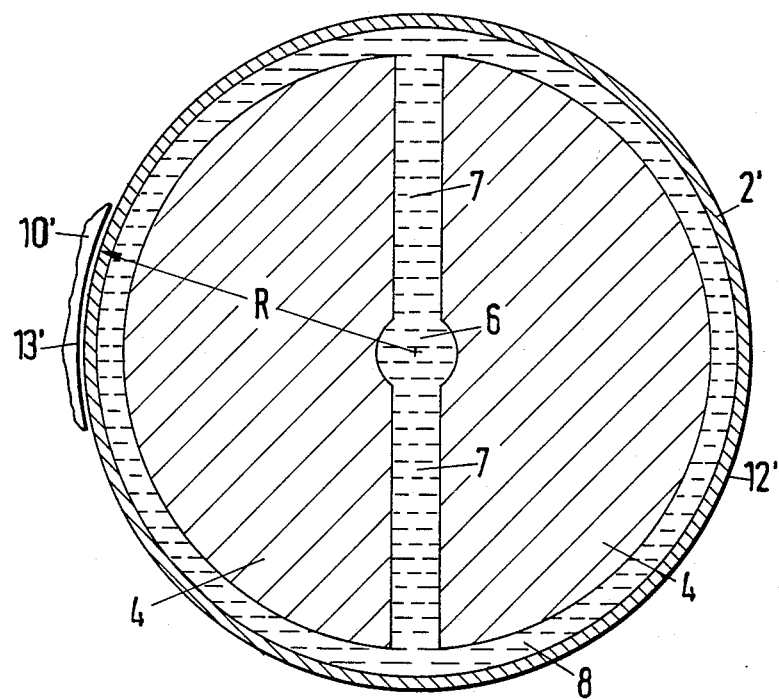
Figure 4:
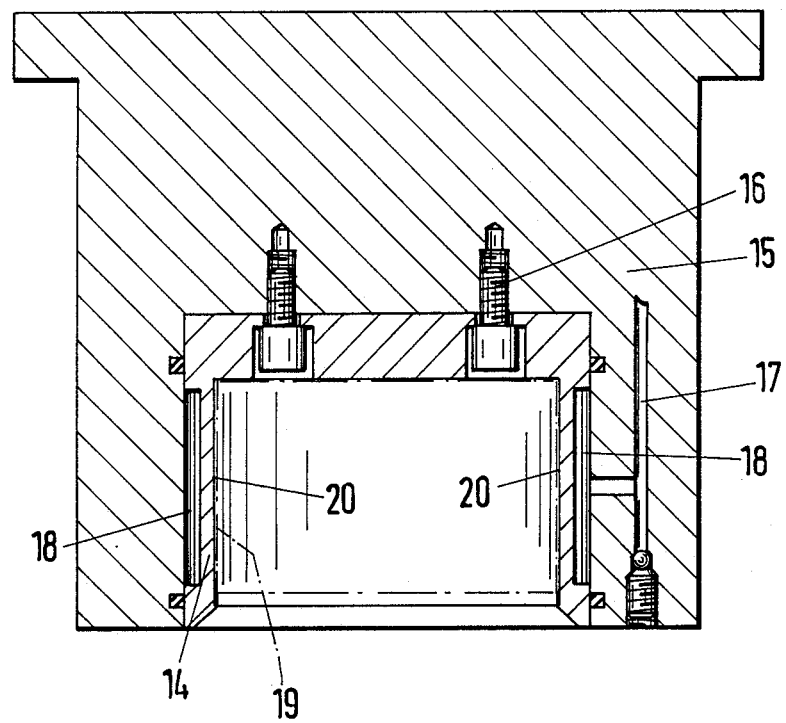

FIG. 1 shows an expandable adapter mandrel equipped with an adapter sleeve according to the invention, in longitudinal section, FIG. 2 shows a cross-section along the line II—II in FIG. 1 but on a larger scale, FIG. 3 shows, in a cross-section as in FIG. 2, another embodiment of an adapter sleeve belonging to an expandable adapter mandrel as in FIG. 1, FIG. 4 shows another example of an embodiment of the invention with a hydraulic lathe chuck and an adapter sleeve which is designed to be pressed from outside inwards against the workpiece to be held.

In the example in FIGS. 1 to 3, the expandable adapter mandrel 1 carries an adapter sleeve 2 which expands outwards and which is fastened, for example by screws 3, to the body of the expandable adapter mandrel. Fluid ducts 5 to 7 are provided in the expandable adapter mandrel which on the one side (see reference number 5) are attached to fluid supply which is not shown in detail here, and on the other side (see reference number 7) conduct the fluid into a cylindrical annular space 8, which extends approximately over the entire clamping length 1 of the adapter sleeve 2 and is on its inner side.

The object 10 to be clamped is pushed in the direction of the arrow 9 over the adapter sleeve 2 and consequently is situated with its inner side located as closely as possible against the outer side of the adapter sleeve. Such an object 10 is indicated by chain dotted lines. A pressure is then exerted by means of a pump, which is not shown, on the fluid medium, preferably a hydraulic oil, which is present in the above mentioned ducts so that the fluid situated in the annular space 8 presses outwards on the adapter sleeve and expands it outwards substantially in this radial direction. As a result of this the object 10 is securely held.

In the embodiment shown in FIG. 2, the adapter sleeve 2 is equipped with outwardly directed teeth 11 in the form of a push-in toothing. They are made of titanium or a titanium alloy and the outer side or outer layer 12 is hard.

FIG. 3 shows another embodiment of the invention which consists of an adapter sleeve 2' in the form of a hollow cylinder which likewise is made of titanium or a titanium alloy and, in this case too, the outer side or outer layer 12' is hard.

The hard outer side or outer layer can in both embodiment examples consist of a hardened outer layer of the titanium or titanium alloy. Instead of this a coating of cubic, crystalline boron nitride (CBN-Korn) can be applied. This coating, likewise, has an appropriate hardness and wear resistance. Such a boron nitride coating is preferably applied electrolytically The particle size may be about 0.015 μm, but the invention is not limited to this. In order to simplify the drawings, one and the same representation has been used for both these possible, but different, coatings. Moreover, because of the small size of the particles in the boron nitride coating they can not be shown true to scale graphically.

The titanium alloy in question may be a titanium-aluminium alloy such as Tial 6 V 4, for example.

In a portion of the left half of FIG. 2 the counter toothing (inner toothing) 13 of the object 10 to be held is shown, whereas FIG. 3 shows a portion of the cylindrical inner side 13' of the object 10' to be held. It can be seen that in the case where the object is clamped by the adapter sleeve by means of its teeth (FIG. 2) the expansion of the adapter sleeve in the radial direction R required to obtain sufficient clamping must be considerably greater than in the embodiment shown in FIG. 3, provided that the gap existing between the outer side of the adapter sleeve and the inner side of the object to be clamped is the same size in both cases. That is to say, therefore, that in the case of FIG. 2 a larger distance must be covered during the expansion of the adapter sleeve than in the case of FIG. 3.

In order to obtain the largest possible expansion, the thicknesses of the walls of the adapter sleeves according to the invention are kept as thin as possible. Thus, for example, the thickness of a 30 mm diameter adapter sleeve, as in the embodiment shown in FIG. 3, may be 0.5 mm. Similar size ratios apply in the case of the embodiment of the invention shown in FIG. 2. For better graphical representation, the sizes of these parts shown in the Figures differ from the above-mentioned ratios.

FIG. 4 shows the principle of the invention in the case of an adapter sleeve 14 which is fastened in a body 15 by means of screws 16. The pressurizing fluid is led through ducts 17 into a cylindrical annular space 18 which surrounds the adapter sleeve 14. In this case too, the object 19 to be clamped is indicated by chain dotted lines. The adapter sleeve 14 together with the hard inner layer 20 is pressed inwards by means of an appropriately high fluid pressure in the annular cylinder 18 and consequently holds the object 19 to be clamped securely by means of the inner layer 20.

The explanations given with regard to the embodiment example in FIGS. 1 to 3 also apply in a general sense here. In particular it should be mentioned that in the case of the embodiment in FIG. 4, a toothing can be provided on the inner side of the adapter sleeve, with an inwardly directed hard layer, in order to clamp the outer toothing of a toothed wheel which is to be held there by the clamping force.

What is claimed is:

1. An adaptor sleeve having a diameter directly alterable by fluid pressure so as to create a clamping force so that an object is clampable by the sleeve, said sleeve being made of one of unhardened titanium and an unhardened titanium alloy, and having a hard layer on a side which clamps the object.

2. An expandable adaptor sleeve made of one of unhardened titanium and an unhardened titanium alloy for an expandable adapter mandrel which is operated by fluid pressure, said sleeve having an inner slide with spaces arranged so as to conduct a fluid which is or will be under pressure, and having an outer side formed so as to push against an object to be clamped, the outer side of the adapter sleeve comprising a hard layer.

3. An adapter sleeve according to claims 1 or 2, wherein the hard layer is a hardened outer side of the titanium or titanium alloy of the adapter sleeve.

4. An adapter sleeve according to claim 2, wherein the hard layer is a coating of cubic, crystalline boron nitride (CBN-Korn).

5. An adapter sleeve according to claim 2, wherein the outer side of the adapter sleeve is a toothing which has an outer side which forms the hard layer.

6. A compressible adapter sleeve made of one of titanium and an unhardened titanium alloy, for an hydraulic lathe chuck which is operated by fluid pressure, said sleeve having an outer side with spaces arranged so as to conduct the fluid which is or will be under pressure, and having an inner side formed so as to push inwards against an object to be clamped, the inner side of the adapter sleeve comprising a hard layer.

7. An adapter sleeve according to claim 6, wherein the hard layer is a hardened inner side of the titanium or titanium alloy of the adapter sleeve.

8. An adapter sleeve according to claim 6, wherein the hard layer is a coating of cubic, crystalline boron nitride (CBN-Korn).

9. An adapter sleeve according to claim 6, wherein the adapter sleeve is constructed with a toothing on the inner side, the toothing having an inwardly directed surface which comprises the hard layer.

10. An adapter sleeve according to claims 4 or 6, wherein the boron nitride coating is made up of particles having an approximate size of 0.015um.

11. An adapter sleeve according to claim 1, wherein the adapter sleeve is made of a titanium-aluminum alloy.

12. An adapter sleeve according to claim 11, wherein the alloy is Tial 6V4.

* * * * *